United States Patent

(12) United States Patent
Kancharla et al.

(10) Patent No.: US 11,315,133 B2
(45) Date of Patent: Apr. 26, 2022

(54) SYSTEM AND METHOD FOR MINIMIZING LATENCY IN DATA CONSUMPTION SYSTEM

(71) Applicant: Capital One Services, LLC, McLean, VA (US)

(72) Inventors: Gopi Kancharla, Frisco, TX (US);
Sanjiv Yajnik, Dallas, TX (US);
Raman Bajaj, Frisco, TX (US);
Praveen Tandra, Allen, TX (US);
Parvesh Kumar, Plano, TX (US);
Arjun Dugal, Dallas, TX (US);
Janardhan Prabhakara, Allen, TX (US); James Land, The Colony, TX (US); Haranatha Ijjurouthu, Irving, TX (US); Hanzhang Zheng, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/776,051

(22) Filed: Jan. 29, 2020

(65) Prior Publication Data

US 2020/0242645 A1    Jul. 30, 2020

Related U.S. Application Data

(60) Provisional application No. 62/799,000, filed on Jan. 30, 2019.

(51) Int. Cl.
*G06Q 30/02*    (2012.01)
*H04L 29/06*    (2006.01)
(Continued)

(52) U.S. Cl.
CPC ..... *G06Q 30/0207* (2013.01); *G06F 11/1443* (2013.01); *H04L 65/60* (2013.01); *G06F 2201/805* (2013.01)

(58) Field of Classification Search
CPC ........... G06Q 30/0242; G06Q 30/0207; G06F 11/1443; G06F 2201/805; H04L 65/60
See application file for complete search history.

(56) References Cited

U.S. PATENT DOCUMENTS 8,229,789 B2 * 7/2012 Riedl ................. G06Q 30/0258
705/14.61
8,401,887 B2 * 3/2013 Moukas ............. G06Q 10/0631
705/7.29

(Continued)

OTHER PUBLICATIONS

Lai, WP., Liou, EC. Virtual queue dropping for robust real-time video over IEEE 802.11aa wireless LANs. J Wireless Com Network 2016, 150 (2016). https://doi.org/10.1186/s13638-016-0631-3 (Year: 2016).*

(Continued)

*Primary Examiner* — Abhishek Vyas
*Assistant Examiner* — Monica A Mandel
(74) *Attorney, Agent, or Firm* — Kacvinsky Daisak Bluni PLLC

(57) ABSTRACT

A campaign server is disclosed which includes a multi-level queue architecture that isolates campaign processing from the delays and inconsistencies of target population information retrieval and a data streaming service system with latency and error remediation measures are disclosed, where the campaign server and the data consumption system can be part of a consolidated system. The data consumption system may include various components to process one or more offers to one or more customers and component configured to detect an error associated the preparation of the errors and/or ii) initiate a retry attempt to process the one or more (Continued)

offers, and/or storing an instruction in a storage component of the streaming data system to permanently prohibit an attempt to generate the one or more offers at a subsequent time if the retry attempt expires without processing the one or more offers.

20 Claims, 7 Drawing Sheets

(51) Int. Cl.
*G06F 11/14* (2006.01)
*H04L 65/60* (2022.01)

(56) References Cited

U.S. PATENT DOCUMENTS

| | | |
|---|---|---|
| 9,389,911 B2 | 7/2016 | Branson et al. |
| 9,606,877 B2 * | 3/2017 | McHugh ............. G06F 11/1471 |
| 2007/0044107 A1 | 2/2007 | Sengodan |
| 2010/0106568 A1 | 4/2010 | Grimes |
| 2010/0313217 A1 * | 12/2010 | Bassali ............. H04N 21/23424 |
| | | 725/32 |
| 2013/0081042 A1 | 3/2013 | Branson et al. |
| 2013/0086188 A1 | 4/2013 | Mays et al. |
| 2014/0040134 A1 | 2/2014 | Ciurea |
| 2015/0180787 A1 | 6/2015 | Hazelet et al. |
| 2016/0224600 A1 | 8/2016 | Munk |
| 2018/0307859 A1 | 10/2018 | LaFever et al. |
| 2019/0268102 A1 * | 8/2019 | Hiremath ......... H04N 21/43637 |

OTHER PUBLICATIONS

Alex Miller, Core Java Concurrency, 2009, Dzone Refcardz #61, pp. 1-6. (Year: 2009).

\* cited by examiner

SYSTEM AND METHOD FOR MINIMIZING LATENCY IN DATA CONSUMPTION SYSTEM

CROSS-REFERENCE TO RELATED APPLICATIONS

The present application claims priority to U.S. Provisional Application No. 62/799,000, filed on Jan. 30, 2019, which is incorporated herein by reference in its entirety.

The present application is related to U.S. patent application Ser. No. 16/191,345 entitled "SYSTEM AND METHOD FOR CONTROLLING CAMPAIGN STREAMING" filed on Nov. 14, 2018, the entirety of which is incorporated herein by reference.

BACKGROUND

Companies invest heavily in marketing campaigns to attract or otherwise influence existing and potential customers. One aspect of marketing involves streaming advertising content to target populations to attract new customers to product and service offerings. Many companies collect target population information to control and/or customize future campaign delivery for maximum impact. The information may include basic information, such as email addresses, and/or more complex information, such as the type of accounts held by the customer, previous purchase histories, previous campaign successes, etc. Such target population information may be used to tailor the marketing content to the particular target population, to thereby improve marketing campaign success and drive company revenue.

However, as marketing campaigns continue to grow more sophisticated and the population of target populations continues to grow so does the amount of data that needs to be processed to support a campaign. The sheer volume of data may strain system resources, resulting in processing bottlenecks and errors that impede effective campaign delivery. It is with these and other considerations in mind that the aspects of the present disclosure are presented.

SUMMARY

One aspect of the present disclosure includes a data consumption system. The data consumption system may include: a consumer component configured to receive customer information from a plurality of partitions associated with a topic of a streaming component, a plurality of components configured to perform one or more operations to generate one or more offers for one or more customers, wherein the received customer information is related to the one or more customers and provided to at least one of the plurality of components configured to perform the one or more operations by the consumer component, and a timeline component configured to i) detect an error associated with preparing the one or more offers, ii) initiate a retry attempt to process the one or more offers, and iii) if the retry attempt expires without processing the one or more offers, storing an instruction in a storage component of the streaming data system to permanently prohibit an attempt to generate the one or more offers at a subsequent time, and wherein the instruction is provided to at least one of the plurality of components configured to perform one or more operations to generate the one or more offers.

The data consumption system may be configured such that the consumer component provides the information associated with the one or more customers to the at least one of the plurality of components configured to perform the one or more operations in parallel, such that an error associated with preparation of the one of the one or more offers based on a first partition of the plurality of partitions does not impact processing of another one of the one or more offers based on a second partition of the plurality of partitions.

The data consumption system may be configured such that the plurality of components are configured to perform the one or more operations to generate the one or more offers and include: a customer attributes component for receiving the received information from the consumer component, a rules engine configured to retrieve one or more rules that govern creation of the one or offers for the one or more customers, where the rules engine initiates the retrieval of the one or more rules after receiving an instruction and customer information from the customer attributes component, a template recommendation component that retrieves one or templates for the one or more offers based on receipt of a rules instruction from the rules engine, and a channel adapter for transmitting the template to the one or more customers using one of a plurality of channels, where the channel adapter selects the one of the plurality of channels based on the one or more templates, and where the plurality of channels include an email channel, a telephone channel, and a text messaging channel.

The data consumption system may be configured such that if the one or more offers are successfully provided to the one or more customers, then at least one of the plurality of components configured to perform the one or more operations to generate the one or more offers for the one or more customers updates the topic of the streaming component with information associated with the successful provision of the one or more offers.

Another aspect of the present disclosure includes a computer implemented method. The computer implemented method may include: receiving a request to process one or more customer offers using a plurality of partitions associated with a topic, determining whether an error has occurred with respect to processing of a first of the one or more customer offers, if an error has occurred with respect to processing the first of the one or more customer offers, retrying to process the one or more offers for a finite duration of time, and if the retrying to process the one or more offers fails continuously during the finite duration of time, permanently disable the processing of the one or more offers.

The computer implemented method may be such that the receiving a request further includes: providing a parallel feed, with respect to each of the plurality of partitions associated with information required, to one or more components processing the one or more offers, where the parallel feed prevents an occurrence of the error associated with the processing of the first of the one or more offers from impacting a processing of another offer of the one or more offers.

Yet another aspect of the present disclosure includes a non-transitory computer-readable storage medium, where the non-transitory computer-readable storage medium can store computer-readable program code executable by a processor to: apply a retry operation for a finite duration to a processing of one or more customer offers in a streaming system, wherein the processing of the one or more customer offers encounters an error that prohibits delivery of the one or more offers to one or more customers, if the retry operation is successful during the retry duration, update a topic associated with a plurality of partitions used in processing the one or more offers with the successful processing, and if the retry operation fails during the finite duration, store an instruction in the streaming system for at least one processing component to permanently prohibit processing of the one or more offers for the one or more customers.

The non-transitory computer-readable storage medium may be such that the program code executable by a processor is further configured to cause the processor to: deliver information from a plurality of partitions to one or more processing components for processing the one or more offers, wherein the delivery of the information in parallel prevents the occurrence of the error associated with the processing of the first of the one or more offers from impacting the processing another offer of the one or more offers.

DEFINITIONS

Figure 1:
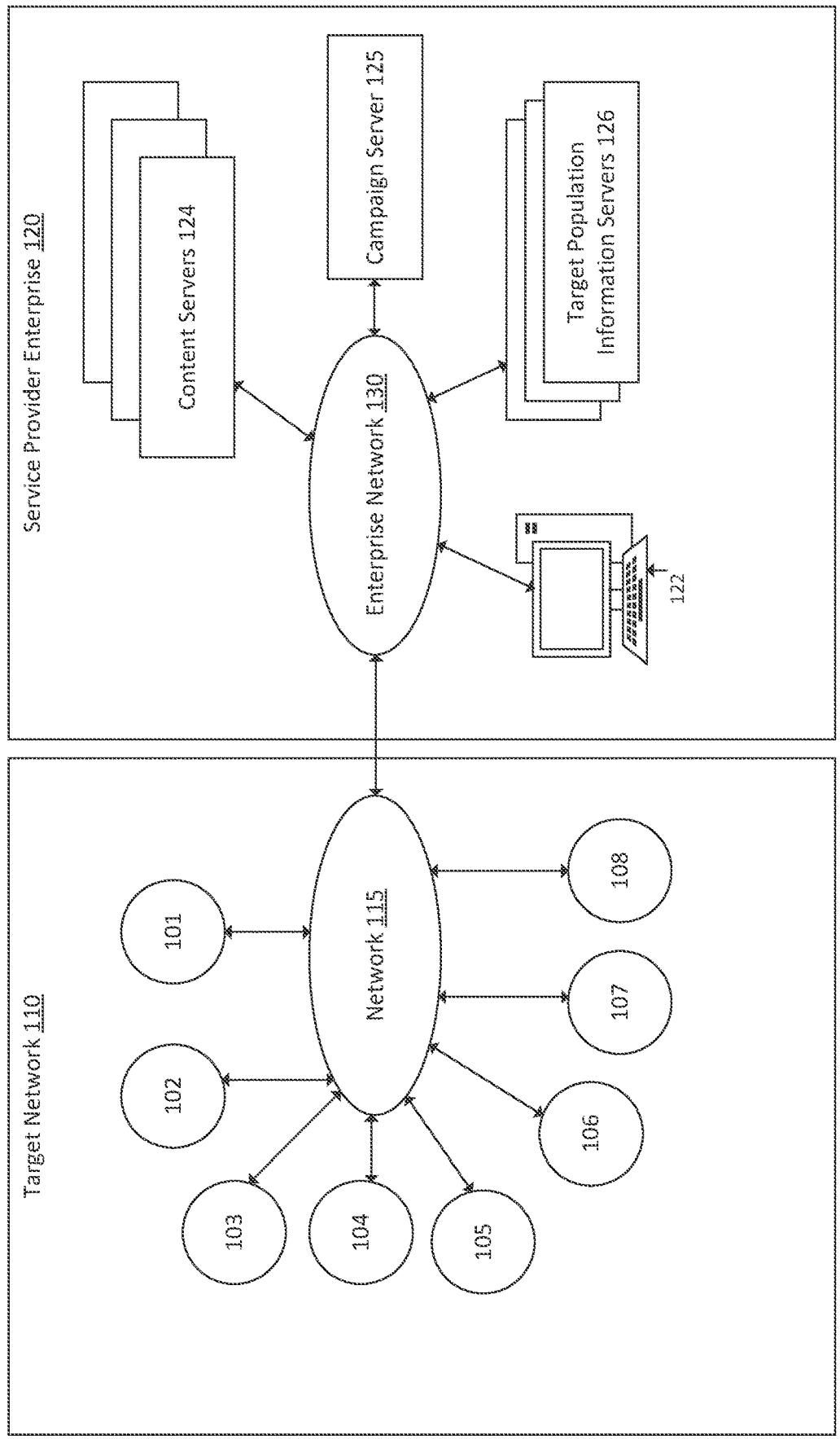
FIG. 1 is a block diagram of a system comprising a campaign server including aspects of an embodiment of the present disclosure.

As used herein, unless specifically indicated otherwise, the word "or" is used in the inclusive sense of "and/or" and not the exclusive sense of "either/or."

Any issued U.S. Patents, allowed applications, published foreign applications, and references that are cited herein are hereby incorporated by reference to the same extent as if each was specifically and individually indicated to be incorporated by reference.

In order for example embodiments of the present invention to be more readily understood, certain terms are first defined below. Additional definitions for the following terms and other terms are set forth throughout the specification.

Array Blocking Queue means a bounded queue in which a fixed-sized array holds elements inserted by producers and extracted by consumers.

Consumer means a messaging agent that retrieves information from a reactive queue.

Offer means any delivery of content to a customer or user, and can refer to any one or more of an advertisement, a promotion, a suggestion, an offer to purchase an item, an offer to engage in a service, an offer for finance terms in relation to a product, and/or the delivery of any suitable creative content or media (images, video, sound, and/or a combination therefrom).

Reactive Queue means a queue that divests information in response to pull requests from consumers.

System/Component/Unit the terms "system", "component" and "unit" are intended to mean a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Queue means a portion of memory including a plurality of entries for buffering data items received from one component prior to forwarding to a second component. Queues include indexing logic for identifying locations in the queue for insertion and removal of data items and are generally referred to according to the protocol following for draining and filling the queues. Examples of queues include but are not limited to First-In-First-Out (FIFO), Last-In-First-Out (LIFO), and Array Blocking Queues.

Target means the intended recipient of a campaign collateral.

DETAILED DESCRIPTION

Many existing campaign servers experience performance issues related to retrieval of target population information. For example, a lack of coordination between consumers of the customer information and the servers of customer information may result in bursty campaign processing, straining campaign resources and causing processing bottlenecks. According to one aspect, an improved campaign server overcomes these issues via a multi-level queue architecture that isolates campaign processing from the delays and inconsistencies of target population information retrieval. In one embodiment, each queue level is intelligently controlled to provide backpressure in accordance with both processing demands of coupled messaging agents and available resources. For example, the queues may be controlled to speed up and/or slow down customer information retrieval in accordance with the progress of campaign processing. Customer information is combined with campaign content by a set of messaging agents, each of which independently processes a campaign for a target. Because messaging agents operate independently of each other, the potential for bottlenecks often encountered during campaign processing is removed. In one embodiment, the set of messaging agents may be dynamically modified during operation to add or remove messaging agents in accordance with the processing needs of a campaign and the available resources of the campaign server. Using this feature a campaign server may auto-scale the messaging agents deployed for campaign processing to optimize campaign streaming in view of available resources.

Latency issues are not limited to campaign servers. Components that interact with campaign servers and/or components that interact with components that are configured or fed by campaign servers, including systems and components with streaming data feeds can also suffer from various defects. For example, a data consumption system configured to interact with a streamer that itself fed or configured by a campaign server can suffer from latency issues and substantive errors when an error in an offer preparation process occurs. The error can occur at various parts of the offer preparation process and/or can be associated with one or more channels for delivering the offer to one or more customers. At least one embodiment of the present disclosure introduces various features to mitigate the latency caused by errors of this kind, including but not limited to i) providing a retry time period and/or integer value (for the number of retries) before terminating the offer process with respect to a particular offer, ii) updating an offer library with the ultimate disposition of an offer with respect to a customer, so as to ensure that feedback errors that use data associated with the particular offer and/or disposition do not compound in the system, iii) and providing a parallel feed from partitions (from a topic of a streamer) that provide the information for generating a particular offer, including a component configured to implement the retry time period and/or integer value (for the number of retries), e.g. a timeline component as discussed herein, so as to prevent the system from experiencing undue latency during the retry time period and/or as it executes each retry step.

In one or more embodiments, the benefits of the features discussed with respect to either one of the campaign server and or the data consumption system with one or more latency-correcting components can be implemented in isolation and provides various benefits standalone, but in at least one embodiment, implementing embodiments from both the campaign server and the data consumption system with one or more latency-correcting components can compound the benefits, including further overall latency reduction and/or further minimization of overall error rates.

FIG. 1 is a block diagram of a system 100 including a target network 110 comprised of a plurality of target customer devices 101-108 coupled via a network 115 to a service provider enterprise 120.

Target customer devices 101-108 may be any computing device capable of receiving and displaying campaign content to a user. Although only eight devices are shown, it is appreciated that a target network may comprise hundreds of thousands of consumers or more. Such devices include, but are not limited to a computer device, or communications device including, e.g., a server, a network appliance, a personal computer (PC), a workstation, a mobile device, a phone, a handheld PC, a personal digital assistant (PDA), a thin client device, a fat client device, an Internet browser, or other device. Target customer devices 101-108 also may be a mobile device; for example, a mobile device may include an iPhone, iPod, iPad from Apple® or any other mobile device running Apple's iOS operating system, any device running Microsoft's Windows® Mobile operating system, and/or any other smartphone or like wearable mobile device.

In some examples, network 115 may be one or more of a wireless network, a wired network or any combination of wireless network and wired network and may be configured to connect customers in target network 110 to service provider enterprise 120. For example, network 115 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

Service Provider enterprise 120 includes resources of a service provider, where a service provider is a company that provides one or more of products and services to customers. In some embodiments, a service provider may be an enterprise that provides services for delivering marketing content to existing and potential customers of a third-party enterprise. In some embodiments, a service provider may be an enterprise that provides numerous products and services to customers and includes resources that may be dedicated to delivering marketing content to existing and potential consumers. The service provider may include an enterprise network 130 that secures communication between interconnected service provider resources. Similar to network 115, the enterprise network 130 may comprise wireless or wireline communication or combination technology and may use protocols such as those of network 115.

The resources of the service provider enterprise 120 may include applications, processing components and storage resources, each of which may comprise both those owned and dedicated specifically to the enterprise, and those licensed or leveraged as part of third-party arrangements, such as cloud-based services, applications, and resources. Components of the service provider enterprise 120 are shown to include a campaign server 125, a content server 124 and a target information server 126. In one embodiment, both the content server 124 and the target information server 126 comprise data storage resources which may be used to respectively store campaign content and campaign target information. Although the data storage resources are shown to be discrete entities, it is appreciated that both the content server 124 and target information server 126 may be comprised of coupled data resources comprising any combination of local storage, distributed data center storage or cloud-based storage.

The service provider enterprise 120 is also shown to include a workstation 122. Workstation 122 is a computing device capable of displaying information and options to a user and communicating campaign build instructions from the user to the campaign server 125. In one embodiment, the workstation may include an interface 123, comprised of software and/or hardware configured for communications with a campaign service application supported by the campaign server. For example, a user at the workstation 122 may input campaign control information including campaign attributes such as campaign content, campaign target population information, campaign schedule, etc. to the campaign server 125 to define and deploy a campaign.

Figure 2A:
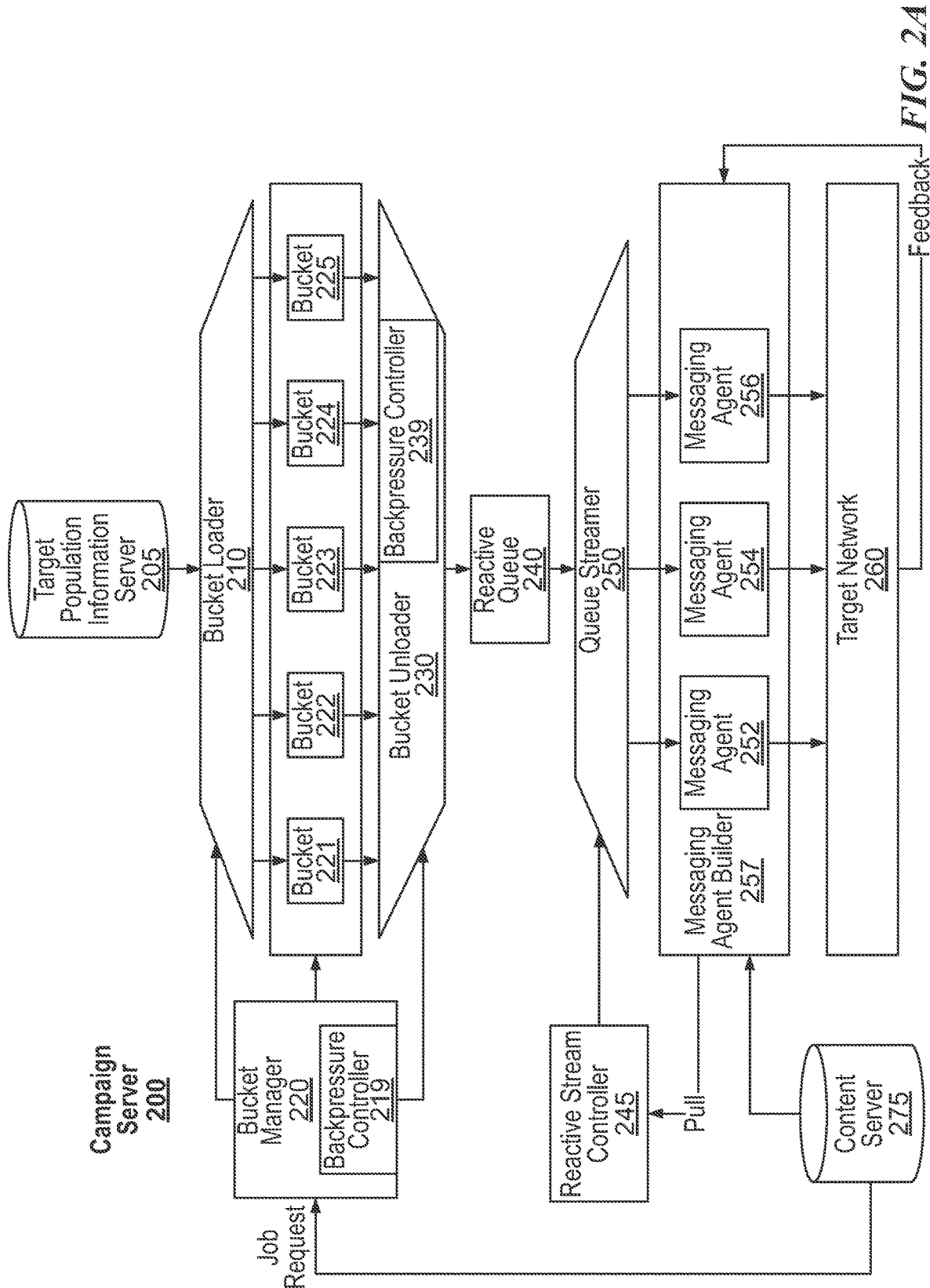
FIG. 2A is a more detailed block diagram of exemplary components of a campaign server which may be used in the system of FIG. 1.

FIG. 2A is a block diagram of exemplary components of a campaign server 200. Although certain functionality is described below as being performed by certain components, it is appreciated that the delineation of functionality between the components is a matter of design, and any attribution of a function to a component below is not meant to limit or otherwise restrict the example embodiments of the invention.

The campaign server in one embodiment includes a plurality of buckets 221, 222, 223, 224 and 225. In an example embodiment, a 'bucket' is a queue comprising a predetermined number of entries, each entry for storing target population information retrieved from target information server 205. In an embodiment, the number and size of buckets may be determined based upon campaign control information received from the user, for example based on the size of a target population or a complexity of a campaign type. Although five buckets are shown, embodiments of the present invention are not limited to any particular number of buckets/queues.

In an example embodiment, the buckets are provisioned or generated by a bucket manager 220 in response to receipt of a job request by a bucket manager 220. Provisioning a bucket may include allocating a portion of a memory resource of the service provider to the bucket and forwarding indexing information associated with the bucket to a bucket loader 210 and a bucket unloader 230. The buckets may be indexed using a variety of queue protocols which prioritize queue data for output, including First-In-First-Out (FIFO), Last-In-Last-Out (LIFO), or prioritization based on one or more aspects of the campaign control information. For example, the queues may prioritize data for release based on target attributes such as target geography or based on campaign attributes such as campaign schedule.

A bucket loader 210 may be disposed between the target information server 205 and the buckets 221-225. The bucket loader 210 may be configured to transfer target population information from the target information server 205 to the queues when the queues have space available to accept such information. In an example embodiment, the bucket loader 210 includes backpressure controller 219 which may preclude transfer of the target population information to the queues when the queues reach a threshold capacity. In an example embodiment, backpressure controller 219 signals the bucket loader 210 to stop forwarding target population information to buckets 221-225 when the buckets have reached a threshold capacity. The threshold capacity may advantageously be selected to account for the time delay between notifying the bucket loader to stop filling the buckets and the bucket loaders ability to stop the flow of target population information, in order to prevent data loss. Thus, a selected threshold capacity in some embodiments is one that leaves sufficient buffer capacity in the queues to accommodate all target population information that may be received while the bucket loader is stopping target population information streaming from the target information server 205. The threshold may be a resource-dependent calculation which takes into consideration, among other system delays, network bandwidth availability, target population server resource delays, target population record size, and content server queue management delays.

A bucket unloader 230 may be disposed between a reactive queue 240 and the plurality of buckets 221-225. The bucket unloader 230 may perform a plurality of tasks including monitoring the buckets 221-225 for the presence of target information and streaming target information from the different buckets into the reactive queue 240. A backpressure controller 239 of bucket unloader may provide information related to the availability of the reactive queue to accept additional target data.

In an example embodiment, the reactive queue is an array blocking queue comprising a fixed-size array that holds target data inserted by producers (i.e., target information server 205/bucket loader 210/buckets 221-225) and extracted by consumers (messaging agents 252, 254, 256). It may be managed as a bounded reactive queue that prioritizes data output using FIFO (first-in-first-out) protocols. A bounded queue is one that defines an upper bound on the number of elements it can store at the same time. A blocking queue is one that blocks attempts to add and remove elements from the queue when, respectively, the queue is full, or the queue is empty. In an example embodiment an array blocking queue protocol is used to drive the backpressure controller 239 to inhibit bucket unloader 230 from forwarding target population information from buckets 221-225 to the reactive queue 240. For example, in one embodiment, an array blocking queue may generated as a data structure using a Java® Collections framework ArrayBlockingQueue class, where array indexing is managed to produce data in a FIFO (first-in, first-out) order. Requests to retrieve data from an ArrayBlockingQueue class are denied when no data is in the queue, provides a hard backpressure signal to the bucket unloader 240.

Requests to insert data into an ArrayBlockingQueue class are denied when there is no data in the queue. In embodiments where the reactive queue 240 is implemented as a Java® ArrayBlockingQueue, denied requests return an IllegalStateException. Java® ArrayBlockingQueues advantageously include defined processes for obtaining queue state information, such as the remaining capacity (i.e., number of elements that the reactive queue 240 can accept before blocking). Such state information may advantageously be used by the bucket unloader backpressure controller 230 to throttle down target population information retrieval.

In addition, the Java® ArrayBlockingQueues include defined processes controlling queue draining, allowing one or more entries to be drained at a time, which may be used by queue streamer 250 and reactive stream controller 245 to direct target population to requesting messaging agents 252, 254, 256.

As shown in FIG. 2, the messaging agents 252, 254, 256 are coupled to the reactive queue 240 via a queue streamer 250. In an example embodiment, the queue streamer may perform a reverse multiplex operation, operating in response to selection input from a reactive stream controller 245 to direct target population information to messaging agents in response to pull requests from the respective messaging agents. In an example embodiment, an agent comprises software code that is programmed to perform a task. A messaging agent builder 257 may generate multiple instances of different forms of program code, in accordance with the selected campaign content as messaging agents and deploy the messaging agents to operate on different processors within the network 115. For example, depending upon the campaign, messaging agents may be deployed to different resources based upon the geography of the resource and its proximity to the target population. Tasks performed by messaging agents may include, but not be limited to, populating and delivering email, text and/or advertising content to customers in the target network 260.

The one or more messages may each be uniquely customized for each of the plurality of respective customers responsive to campaign content and information that is personal to each target. For example, in one embodiment campaign content may selected form a pre-existing set of campaign collateral templates, such as email templates, text templates, advertising windows and the like. In some embodiments, a messaging agent may populate the campaign collateral template with target specific information. In other embodiments, a messaging agent may select among a set of templates allocated to a campaign based on attributes of the target, such account information, prior purchase history, determined delivery preferences, etc. Each messaging agent may be deployed to different resources throughout a network 115 to drive campaign delivery and may communicate with network endpoint to coordinate delivery to targets, for example by displaying advertising on a third-party web page. Each messaging agent may also communicate back to the campaign server, for example, providing additional target population information, such as interest manifested by click behavior, that may assist future directed campaign efforts.

As may be described in more detail below, according to one aspect the messaging agents 252, 254 and 256 are deployed by a messaging agent generator 257 of the campaign server at campaign initialization. The number of messaging agents deployed at initialization may vary according to campaign control information input by the user. For example, campaign control information that relates to the complexity of the campaign, such as the size of the target population and the processing load imposed by the campaign, as well as amount of resources available to the campaign server, may factor into the determination of the number of messaging agents that may be deployed. In one aspect, the number of messaging agents 252, 254, 256 may automatically vary during campaign execution, auto-scaling in accordance with variances in resource availability at the campaign server 200. That is, as available resources decline, the campaign server may reduce the number of deployed messaging agents, and as more resources become available, the campaign server may increase the number of deployed messaging agents.

As mentioned above, in an example embodiment, the reactive queue 240 may be a reactive queue that operates in response to 'pull' requests from messaging agents 252, 254, 256. While only three messaging agents are shown, it can be appreciated that one feature of the present invention is the ability to deploy as many messaging agents as system resources allow in order to provide massive parallel processing of campaign delivery, thereby increasing campaign efficiency and throughput. The volume is further enhanced by the fact that the agents are configured to independently operate on their own tasks. As such, performance issues encountered by one messaging agent may have minimal impact on overall campaign effectiveness. In addition, differences in processing complexity by the respective agents as they work on different campaign content, target population and delivery tasks do result in overall campaign processing delays.

In addition, in contrast to prior art implementations where target population information delivery is driven by the data source, in one aspect each messaging agent drives its own consumption by pulling from the reactive queue 240 when processing capability becomes available at the agent, thereby minimizing delays and further increasing campaign throughput.

The queue streamer 250 works cooperatively with the reactive stream controller 245 to direct target population information to available messaging agents 252, 254, 256.

Messaging agents combine campaign content, retrieved from content server 275, with target population information and feedback from previous campaign efforts to generate and delivery campaign messaging to customers in target network 260.

Figure 2B:
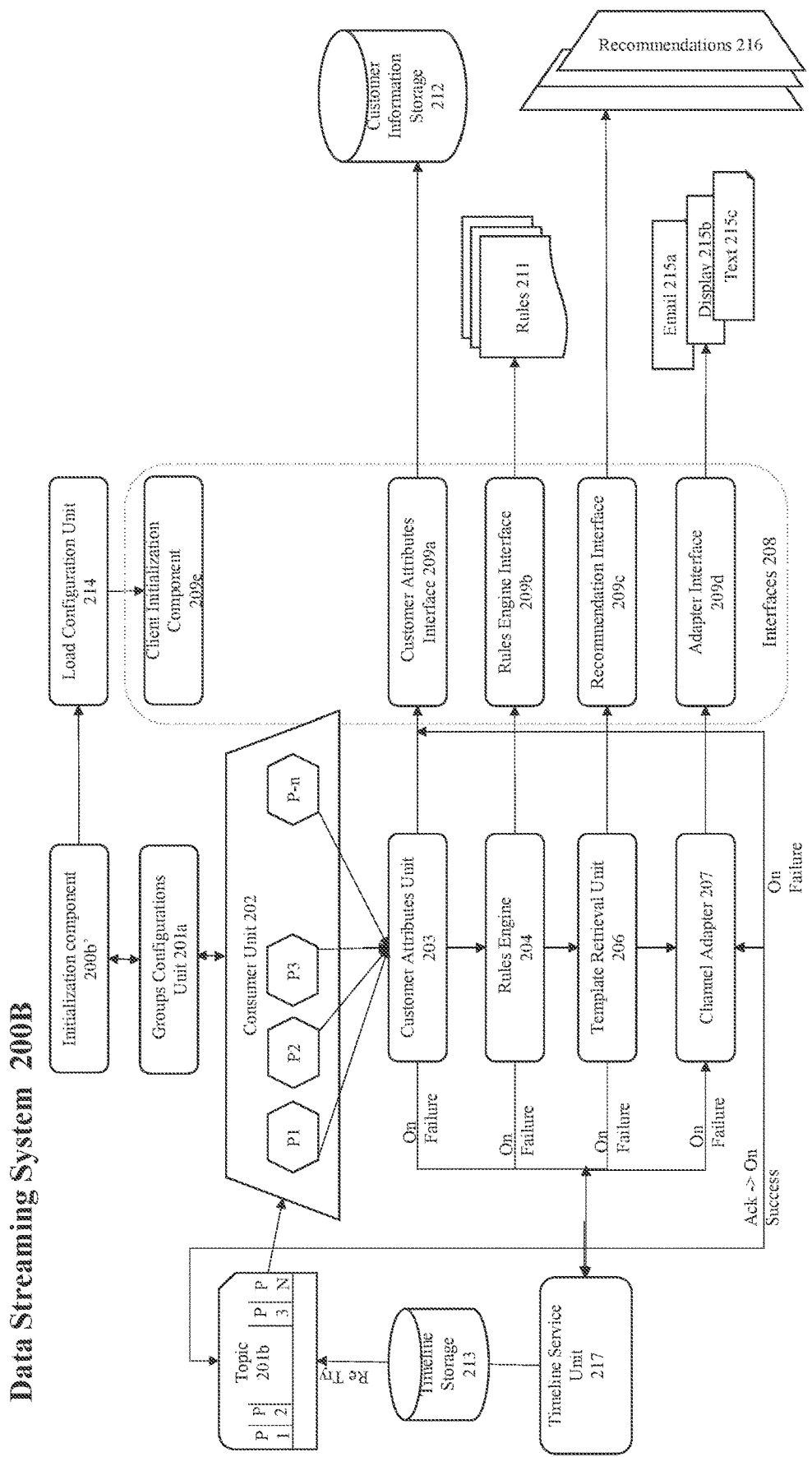
FIG. 2B is a block diagram of a data consumption system including aspects of an embodiment of the present disclosure.

FIG. 2B is a block diagram of exemplary components of a dynamic data processing system or data consumption system 200B with capabilities of minimizing latency associated with streaming errors of the system 200B. Although certain functionality is described below as being performed by certain components, it is appreciated that the delineation of functionality between the components is a matter of design, and any attribution of a function to a component below is not meant to limit or otherwise restrict the example embodiments of the invention.

In an embodiment, the system 200B includes an initialization component 200b' for initiating one or more operations of the system 200B, including operations with one or more components and/or units as discussed herein with respect to system 200B. In an embodiment, the system 200B includes a group configurations unit 201 that retrieves information from various partitions p1, p2, p3 . . . pN of a topic (e.g. streaming process of a streaming platform) 201b associated with a streaming process or streaming component. In an embodiment, the load configuration unit 214, in coordination with the initialization component 200b', may update various components at initialization and throughout processing, e.g. components 203-207, by utilizing external interfaces 208. In an embodiment, the group configuration component 201a feeds the consumer unit 202 information, e.g. URL information, IP address, topic name of topic 201b, partition locations, numbers, and size, etc. with respect to the topic 201b and topic 201b partitions p1, p2, p3 . . . pN such that the consumer unit 202 can subscribe and access to the topic 201b and the various partitions p1, p2, p3 . . . pN. In an embodiment, the topic 201b may consume or pull all of the messages and/or information included in the various partitions p1, p2, p3 . . . pN. In an embodiment, the consumed information and/or messages of the partitions p1, p2, p3 . . . pN is all or in part associated with customer information for customers that are eligible to receive information, e.g. template offers, from various channels of the system 200B.

In an embodiment, the consumer unit 202 provides the consolidated customer information to a customer attributes unit 203, and the customer attributes unit 203 can obtain a more particularized set of information about one or more customers by interfacing with a customer attributes interface 209a, and lifting customer information, e.g. name, address, credit scores, etc. from a customer information storage 212. This information provides a basis for carrying out one or more additional operations for generating one or more offers for one or more customers. In an embodiment, the consumer unit 202 provides a parallel flow for processing the information associated with the partitions P1, P2, P3 . . . P-n, where this offers at least one advantage, including but not limited to the ability to ensure that an error in processing an offer associated with one partition, e.g. P1, by one or more of the downstream components discussed below, e.g. 203-

207, may not affect processing of information associated with other partitions, e.g. P1-P-n.

In an embodiment, the rules engine 204, which processes information provided by the customer attributes unit 203, may interface via a rules engine interface 209b with rules logic 211 to determine whether or not one or more customers are eligible to receive a particular offer, e.g. by applying rules based on one or more factors such as credit-worthiness, location, income, etc. If the one or more customers are eligible to receive an offer based on the determination made by the rules engine 204, a template retrieval unit 206 may interface with a recommendation interface 209c and select one or more recommendation templates from a recommendation storage 216 to provide the one or more offers to the customer, e.g. the template may refer to the look and feel of delivering the one or more offers, such as color, text content, organization, logo distribution and presentation, etc. Once the template or templates are selected, a channel adapter 207 may interface with an adapter interface 209d to determine the best channel, e.g. email 215a, live-time display 215b, text messaging 215c, calling (not shown), and/or any other suitable channel for delivery.

In an embodiment, preparation of the one or more offers can have an operational fail during processing by any one of the customer attributes unit 203, the rules engine 204, the template retrieval unit 206, and/or the channel adapter 207, e.g. a technical error associated with operations carried out by those components, and/or a technical error anywhere else in the system 200b. In an embodiment, the component or components associated with the failure may record the failing event directly into a timeline storage 213 and/or provide a timeline service unit 217 with the failure information, which in turn may register the failure in the timeline storage 213. In an embodiment, the timeline service unit 217 may initiate a retry operation in the instance of failure. The timeline service unit 217 may coordinate with the consumer unit 202 to apply the retry operation, e.g. re-initiate a flow and associated operations for generating an offer from 202-207 for a predetermined time, e.g. two hours and/or for a predetermined interval of full process tries, e.g. five distinct cycles running a flow of one or more operations associated with 202-207. In an embodiment, the retry operation may be directed to the particular partition associated with generating the one or more offers, so as not to interrupt the process flow associated with other partitions, and in an embodiment, can be started at the point where the error occurred, e.g. at the template retrieval unit 206 if the error was associated with the generation of a template.

In an embodiment, whether the one or more offers is successfully processed at the start, successfully processed as a result of a retry operation, and/or logged as a fail, the timeline service unit 217 may record the event in the timeline storage 213, which in turn can result in the topic 201b, and associated partition from which the information deriving the one or more offers is based, being updated. In an embodiment, this ensures that particular one or more offers with respect to particular one or more customers are not made again, thus avoiding redundancy and misallocation of computer resources. In an embodiment, in the event of a failure, at least one additional benefit can be realized, including but not limited to preventing failed one or more offers for one or more customers from adversely affecting feedback mechanisms in a streamer associated with topic 201b and/or adversely affecting any other component that utilized feedback to make determinations with respect to process additional requests based on the previously process results of previous offers made to clients. In an embodiment, the load configuration 214 may coordinate with one or more components, e.g. initialization component 200b', to update the interfaces (external or internal interfaces) 208, described individually above, so that when one of the processing components 203-207 interacts with a corresponding interface, e.g. the customer attributes unit 203 does not process a previously failed offer upon interacting with the customer attributes interface 209a. In an embodiment, the individual components, e.g. 203-207, may be set at initialization to automatically reject processing previously failed offers. In an embodiment, the consumer unit 202 may be configured to determine that a previous offer or offers has failed in association with a particular partition during its communication with topic 201b and may accordingly interrupt any flow with respect to such an offer from being processed further and/or from being used in any feedback capacity.

Figure 2C:
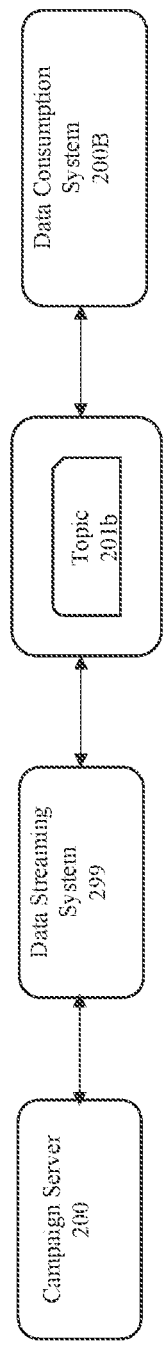
FIG. 2C is a high-level block diagram illustrating a relationship between the campaign server of FIG. 2A and the data consumption system of FIG. 2B according to an embodiment of the present disclosure.

FIG. 2C is a high-level block diagram of exemplary components of a consolidated system that includes campaign server 200 and dynamic data processing system or data consumption system 200B. In an embodiment, campaign server 200 configures a data streaming system or streamer 299 that includes and/or configures one or more topics, including topic 201b. Various techniques discussed with respect to campaign server 200 may enhance efficiency of a streamer 299 and the accuracy and processing of information associated therewith. In an embodiment, the dynamic data processing or data consumption system 200B utilizes information from streamer 299, including accessing and utilizing partitions of topic 201b. Various techniques discussed with respect to system 200B alleviate latency issues. As such, a consolidated system implementing both system 200 and system 200B can take advantage of the benefits of both, and scale those benefits accordingly.

Figure 3:
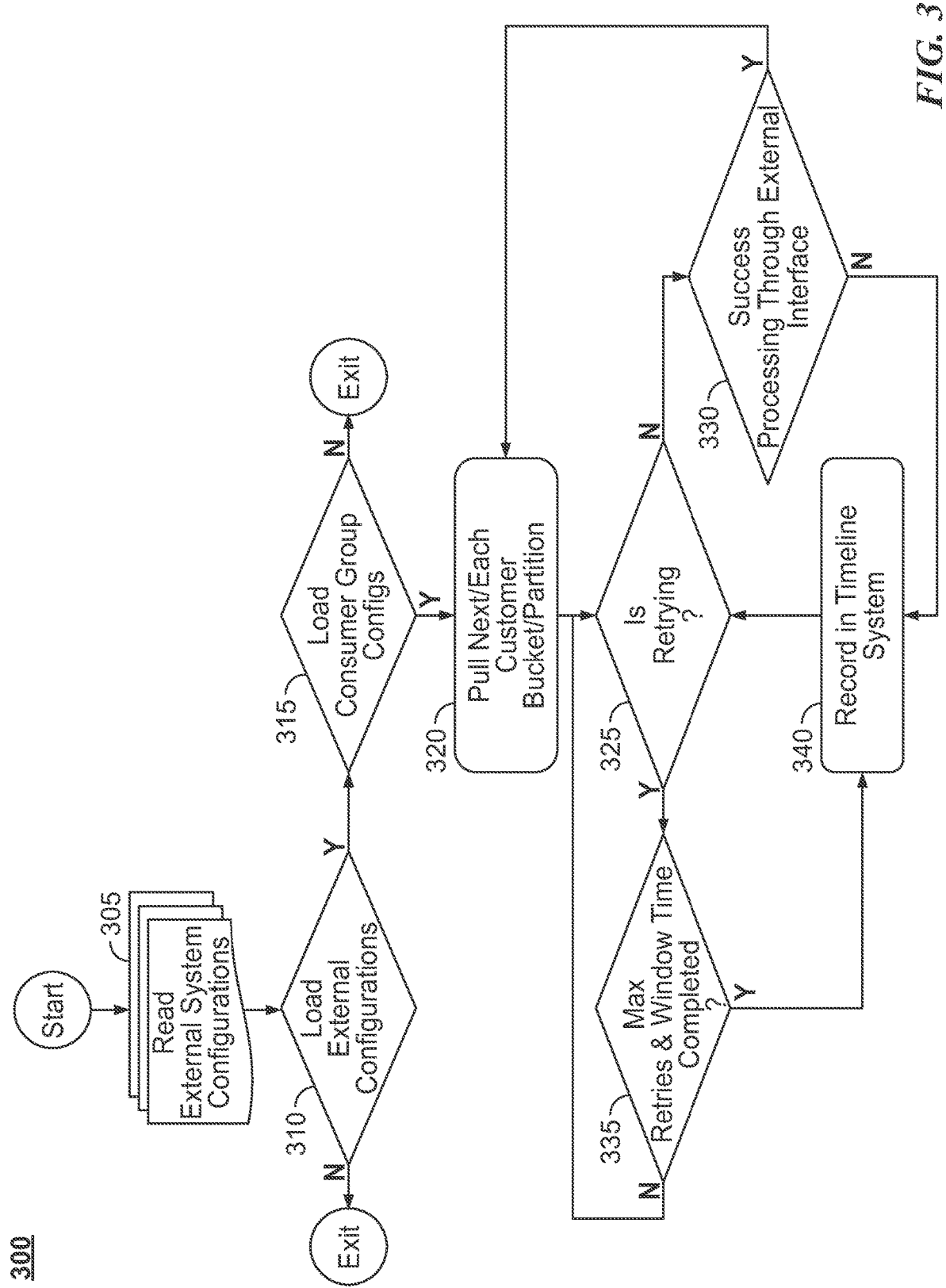
FIG. 3 is a data flow diagram provided to illustrate exemplary operations that may be performed by a data consumption system according to an example embodiment of the present disclosure.

FIG. 3 is a flow diagram illustrating exemplary operations and/or blocks 300 that may be performed for latency and error mitigation with respect to a data consumption system according to example embodiments of the present disclosure. At block 305, one or more components of a suitable system, such as system 200B as discussed herein, may read external system configurations to obtain relevant external information and inputs to load a system to utilize a data consumption system to produce one or more offers for one or more customers, e.g. obtaining customer information from external sources. At block 310, the external configurations may be loaded into the system.

At block 315, one or more components of the system may load various internal configurations, such as customer configurations obtained from a topic of a streamer (by way of non-limiting example). If the load operations of block 310 and/or 315 do not take place, the system may exit the flow. Once both the load operations of block 310 and 315 take place, one or more components of the system, as show in block 320, may obtain and process various customer information from one or more sources, e.g. partitions of a topic associated with a streamer, and prepare one or more offers for one or more customers.

Once the various information is obtained per block 320, the flow proceeds to block 325, and one or more components of the system may determine if a retry operation is in effect as a result of a system error in processing the one or more offers. If it is determined that a retry operation is not in effect, the flow proceeds to block 330, and one or more components of the system may determine if there is success processing the one or more offers through one or all interfaces, e.g. external interfaces, associated with processors used to process the one or more of offers. If the one or more offers are successfully processed, the flow returns to block 320. If the one or more offers are not successfully processed and not part of a retry, then one or more components, as shown in block 340, may register the failure in a suitable storage unit.

At block 325, if one or more components of the system determine that a retry operation is in effect, the process flow moves to block 335, and one or more components may determine if the maximum amount of time for attempting the retry operation has expired and/or if the maximum number of retry attempts have occurred. If the maximum amount of time has not expired and/or the maximum number of retry attempts has not yet occurred, the flow moves back to block 325. If the one or more components determine the retry time period has expired and/or the maximum number of retry attempts have been made, then the flow moves to block 340, and one or more components of the system may register the attempt as a failure in any suitable storage unit.

Figure 4:
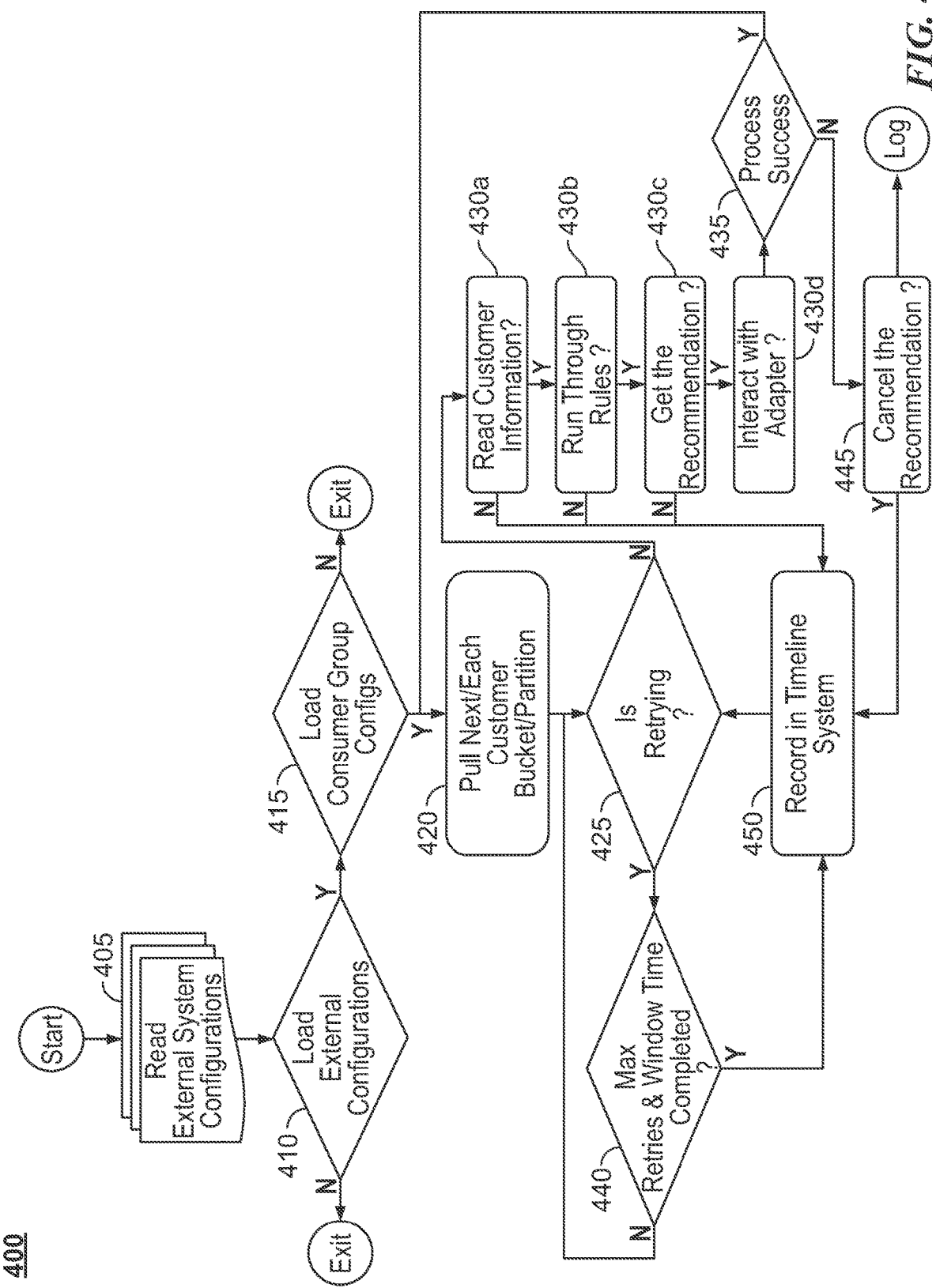
FIG. 4 is a data flow diagram provided to illustrate exemplary operations that may be performed by a data consumption system according to an example embodiment of the present disclosure.

FIG. 4 is a flow diagram illustrating exemplary operations and/or blocks 400 that may be performed for latency and error mitigation with respect to a data consumption system according to example embodiments of the present disclosure. At block 405, one or more components of a suitable system, such as system 200B as discussed herein, may read external system configurations to obtain relevant external information and inputs to load a system to utilize a data consumption system to produce one or more offers for one or more customers, e.g. obtaining customer information from external sources. At block 410, the external configurations may be loaded into the system.

At block 415, one or more components of the system may load various internal configurations, such as customer configurations obtained from a topic of a streamer (by way of non-limiting example). If the load operations of block 410 and/or 415 do not take place, the system may exit the flow. Once both the load operations of block 410 and 415 take place, one or more components of the system, as shown in block 420, may obtain and process various customer information from one or more sources, e.g. partitions of a topic associated with a streamer, and prepare one or more offers for one or more customers.

Once the various information is obtained per block 420, the flow proceeds to block 425, and one or more components of the system may determine if a retry operation is in effect as a result of a system error in processing the one or more offers. If it is determined that a retry operation is not in effect, the flow proceeds to carry out one or more operations for processing one or more offers to one or more customers. The flow then moves to 430a, where one or more components may read various customer information from one or more parts of the system. The flow then moves to 430b, where one or more rules may be applied to determine eligibility for the one or more customers with respect to the one or more offers, in addition to determining terms and conditions associated therewith. The flow then moves to 430c, where a recommendation template and/or medium of providing the offer to one or more customers is generated by one or more components of the system. The flow moves to 430d, where the template with the offer is provided to a suitable component for transmission to the one or more customers, e.g. a channel adapter sends the template with the offer out using a suitable channel, e.g. email, text, etc. At each point in the flow from 420a-430d, one or more components evaluate whether the process is proceeding, e.g. succeeding and operating normally, as shown in block 435.

If there is a technical error with respect to any of the operations associated with operations 430a-430d and/or if a substantive rejection of the one or more offers for the one or more customers is made (e.g. a rules engine decides a customer is ineligible for the offer), then the flow moves to block 445 and the transaction may be cancelled by one or more suitable components, and the flow proceeds to block 450 where the failure may be recoded in a suitable storage system by one or more suitable components of the system, and the flow proceeds to block 425 to determine if a suitable retry period can be initiated and/or has expired.

If the operations associated with blocks 430a-430d are a success, as shown in block 435, the flow proceeds to back to block 420.

If at block 420 it is determined that a suitable retry period is in effect, or if a technical failure is detected and recorded as shown in block 450 and it is determined by one or more components that a retry period can be initiated (as it has previously not been attempted for the one or more offers and/or has not expired with respect to the one or more offers), then the flow moves to block 440.

At block 440, one or more components may determine if the maximum amount of time for attempting the retry operation has expired and/or if the maximum number of retry attempts have occurred. If the maximum amount of time has not expired and/or the maximum number of retry attempts has not yet occurred, the flow moves back to block 430a. If the one or more components determine the retry time period has expired and/or the maximum number of retry attempts have been made, then the flow moves to block 425, and the one or more components of the system may register the attempt as a failure in any suitable storage unit. It should be noted that in instances where a previous offer has been logged as a failure, the flow from 450 may revert back directly to 420 (although not expressly shown in FIG. 4).

Figure 5:
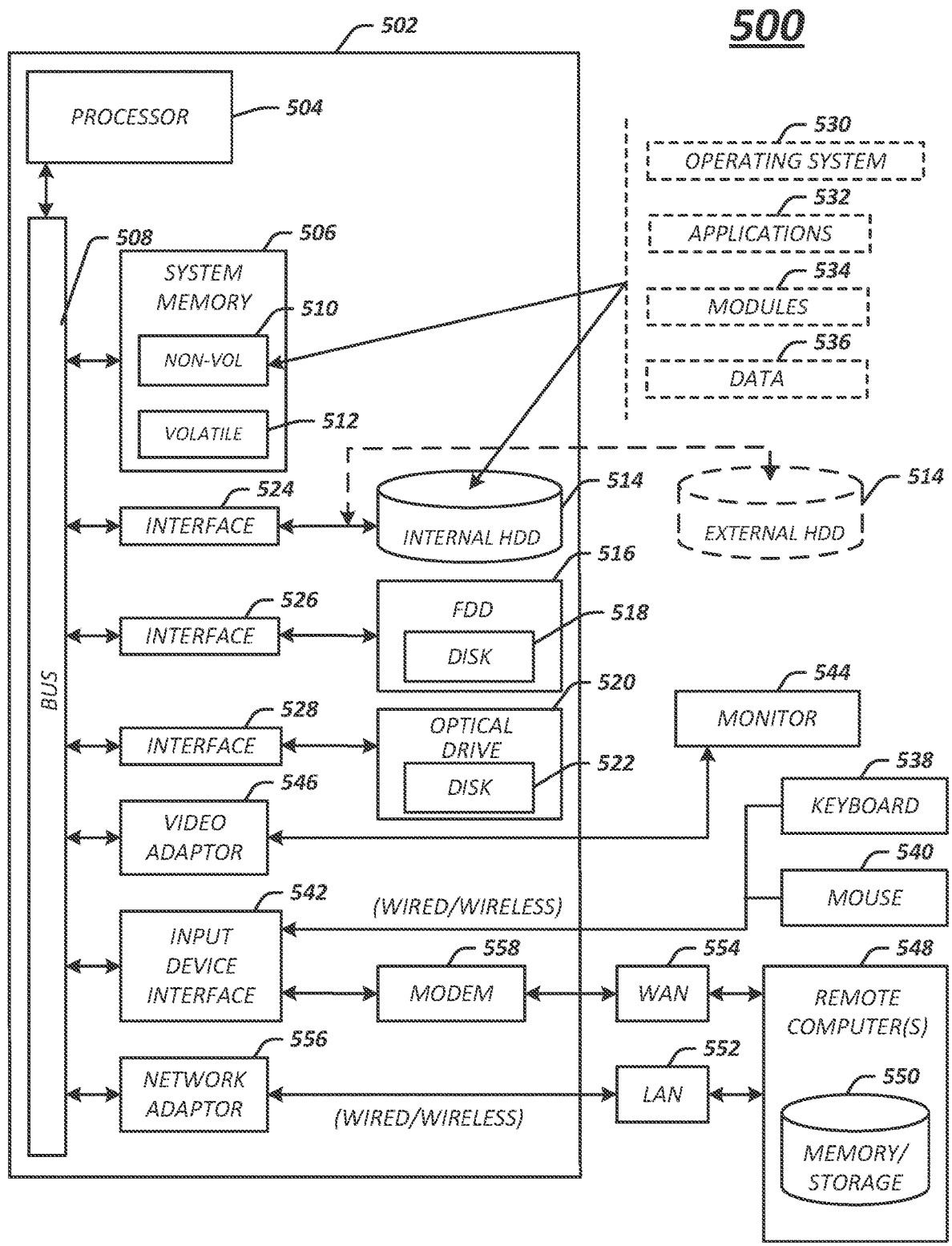
FIG. 5 illustrates a computing system.

FIG. 5 illustrates an embodiment of an exemplary computing architecture 500 comprising a computing system 502 that may be suitable for implementing various embodiments as previously described. In various embodiments, the computing architecture 500 may comprise or be implemented as part of an electronic device. In some embodiments, the computing architecture 500 may be representative, for example, of a system that implements one or more components of the systems 100, 200, 200B, and/or 200C. More generally, the computing architecture 500 is configured to implement all logic, applications, systems, methods, apparatuses, and functionality described herein with reference to FIGS. 1-4.

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 502 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 502.

As shown in FIG. 5, the computing system 502 comprises a processor 504, a system memory 506 and a system bus 508. The processor 504 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 504.

The system bus 508 provides an interface for system components including, but not limited to, the system memory 506 to the processor 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computing system 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies. The computing system 502 is generally is configured to implement all logic, systems, methods, apparatuses, and functionality described herein with reference to FIGS. 1-4.

The drives and associated computer-readable media provide volatile and/or nonvolatile storage of data, data structures, computer-readable instructions, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the systems 100, 200, 200B, and/or 200C.

A user can enter commands and information into the computing system 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computing system 502. In addition to the monitor 544, a computer typically includes other peripheral output devices, such as speakers, printers, and so forth.

The computing system 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computing system 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 552 and the WAN 554.

When used in a LAN networking environment, the computing system 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computing system 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computing system 502, or portions thereof, can be stored in the remote memory/storage device 550. It will be appreciated that the network connections shown are exemplary and other means of establishing a communications link between the computers can be used.

The computing system 502 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatuses or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines may appear from the description given.

It is emphasized that the Abstract of the Disclosure is provided to allow a reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A streaming data system, comprising:
a processor; and
a memory storing instructions which when executed by the processor cause the processor to:
   receive customer information from a plurality of partitions associated with a topic of a streaming component;
   generate, based on a plurality of operations of a process flow, one or more offers for one or more customers, wherein the received customer information is related to the one or more customers;
   store a first offer of the one or more offers in a first queue for retrieval by a second queue associated with the one or more customers;
   process, by a messaging agent, the first offer stored in the second queue;
   detect, at a first operation of the plurality of operations of the process flow, an error associated with generating a second offer of the one or more offers;
   initiate a retry attempt to generate the second offer, wherein the retry attempt begins at the first operation of the process flow;
   determine the retry attempt expires without processing the second offer;
   store an instruction in a storage component of the streaming data system to permanently prohibit a subsequent attempt to generate the second offer and store the second offer in the first or second queues at a subsequent time, and wherein the instruction is provided to a plurality of processing components configured to perform the plurality of operations of the process flow to generate at least one offer;
   determine: (i) one or more delays in the streaming data system, (ii) an available network bandwidth of the streaming data system, and (iii) a size of records stored by the first and second queues;
   select a threshold number of records based on the one or more delays in the streaming data system, the available network bandwidth of the streaming data system, and the size of records stored by the first and second queues;
   determine the first queue stores a number of records equaling the threshold number of records; and
   transmit an indication to the streaming component specifying to stop transmitting customer information to be stored in the first queue.

2. The streaming data system of claim 1, wherein the information associated with the one or more customers is provided to the at least one of the plurality of processing components configured to perform the plurality of operations of the process flow in parallel, such that an error associated with preparation of the one of the one or more offers based on a first partition of the plurality of partitions does not impact processing of another one of the one or more offers based on a second partition of the plurality of partitions, wherein providing the instruction to the plurality of processing components causes the plurality of processing components to refrain from subsequently attempting to generate the second offer, wherein the first operation is subsequent to a second operation in the process flow, wherein the retry attempt does not include the second operation.

3. The streaming data system of claim 2, the memory storing instructions which when executed by the processor cause the processor to:
retrieve one or more rules that govern creation of the one or offers for the one or more customers;
retrieve one or more templates for the one or more offers based on receipt of a rules instruction; and
transmit the templates to the one or more customers using one of a plurality of channels.

4. The streaming data system of claim 3, wherein the one of the plurality of channels is selected based on the one or more templates, and wherein the plurality of channels includes an email channel, a telephone channel, and a text messaging channel.

5. The streaming data system of claim 4, the memory storing instructions which when executed by the processor cause the processor to:
retrieve, by the second queue, the first offer from the first queue;
pull, by the messaging agent, the first offer from the second queue;
determine the first offer is successfully provided to the one or more customers by the messaging agent via one or more of the plurality of channels; and
update the topic of the streaming component with information associated with the successful provision of the first offer.

6. The streaming data system of claim 3, wherein the second queue comprises an array blocking queue.

7. A computer-implemented method, comprising:
receiving, by a processor, customer information from a plurality of partitions associated with a topic of a streaming component of a streaming data system;
generating, by the processor based on a plurality of operations of a process flow, one or more offers for one or more customers, wherein the received customer information is related to the one or more customers;
storing, by the processor, a first offer of the one or more offers in a first queue for retrieval by a second queue associated with the one or more customers;
processing, by a messaging agent executing on the processor, the first offer stored in the second queue;
detecting, by the processor at a first operation of the plurality of operations of the process flow, an error associated with generating a second offer of the one or more offers;
initiating, by the processor, a retry attempt to generate the second offer, wherein the retry attempt begins at the first operation of the process flow;
determining, by the processor, that the retry attempt expires without processing the second offer;
storing, by the processor, an instruction in a storage component of the streaming data system to permanently prohibit a subsequent attempt to generate the second offer and store the second offer in the first or second queues at a subsequent time, and wherein the instruction is provided to a plurality of processing components configured to perform the plurality of operations of the process flow to generate at least one offer;
determining, by the processor: (i) one or more delays in the streaming data system, (ii) an available network bandwidth of the streaming data system, and (iii) a size of records stored by the first and second queues;
selecting, by the processor, a threshold number of records based on the one or more delays in the streaming data system, the available network bandwidth of the streaming data system, and the size of records stored by the first and second queues;
determining, by the processor, the first queue stores a number of records equaling the threshold number of records; and
transmitting, by the processor, an indication to the streaming component specifying to stop transmitting customer information to be stored in the first queue.

8. The method of claim 7, wherein the information associated with the one or more customers is provided to the at least one of the plurality of processing components configured to perform the plurality of operations of the process flow in parallel, such that an error associated with preparation of the one of the one or more offers based on a first partition of the plurality of partitions does not impact processing of another one of the one or more offers based on a second partition of the plurality of partitions.

9. The method of claim 8, wherein providing the instruction to the plurality of processing components causes the plurality of processing components to refrain from subsequently attempting to generate the second offer, wherein the first operation is subsequent to a second operation in the process flow, wherein the retry attempt does not include the second operation.

10. The method of claim 9, further comprising:
retrieving, by the processor, one or more rules that govern creation of the one or offers for the one or more customers;
retrieving, by the processor, one or more templates for the one or more offers based on receipt of a rules instruction; and
transmitting, by the processor, the templates to the one or more customers using one of a plurality of channels.

11. The method of claim 10, wherein the one of the plurality of channels is selected based on the one or more templates, and wherein the plurality of channels includes an email channel, a telephone channel, and a text messaging channel.

12. The method of claim 11, further comprising:
retrieving, by the second queue, the first offer from the first queue;
pulling, by the messaging agent, the first offer from the second queue;
determining, by the processor, the first offer is successfully provided to the one or more customers by the messaging agent via one or more of the plurality of channels; and
updating, by the processor, the topic of the streaming component with information associated with the successful provision of the first offer.

13. The method of claim 7, wherein the second queue comprises an array blocking queue.

14. A non-transitory computer-readable storage medium storing instructions that when executed by a processor cause the processor to:
receive customer information from a plurality of partitions associated with a topic of a streaming component of a streaming data system;
generate, based on a plurality of operations of a process flow, one or more offers for one or more customers, wherein the received customer information is related to the one or more customers;
store a first offer of the one or more offers in a first queue for retrieval by a second queue associated with the one or more customers;

process, by a messaging agent, the first offer stored in the second queue;

detect, at a first operation of the plurality of operations of the process flow, an error associated with generating a second offer of the one or more offers;

initiate a retry attempt to generate the second offer, wherein the retry attempt begins at the first operation of the process flow;

determine the retry attempt expires without processing the second offer;

store an instruction in a storage component of the streaming data system to permanently prohibit a subsequent attempt to generate the second offer and store the second offer in the first or second queues at a subsequent time, and wherein the instruction is provided to a plurality of processing components configured to perform the plurality of operations of the process flow to generate at least one offer;

determine: (i) one or more delays in the streaming data system, (ii) an available network bandwidth of the streaming data system, and (iii) a size of records stored by the first and second queues;

select a threshold number of records based on the one or more delays in the streaming data system, the available network bandwidth of the streaming data system, and the size of records stored by the first and second queues;

determine the first queue stores a number of records equaling the threshold number of records; and transmit an indication to the streaming component specifying to stop transmitting customer information to be stored in the first queue.

15. The non-transitory computer-readable storage medium of claim 14, wherein the information associated with the one or more customers is provided to the at least one of the plurality of processing components configured to perform the plurality of operations of the process flow in parallel, such that an error associated with preparation of the one of the one or more offers based on a first partition of the plurality of partitions does not impact processing of another one of the one or more offers based on a second partition of the plurality of partitions.

16. The non-transitory computer-readable storage medium of claim 15, wherein providing the instruction to the plurality of processing components causes the plurality of processing components to refrain from subsequently attempting to generate the second offer, wherein the first operation is subsequent to a second operation in the process flow, wherein the retry attempt does not include the second operation.

17. The non-transitory computer-readable storage medium of claim 16, storing instructions which when executed by the processor cause the processor to:

retrieve one or more rules that govern creation of the one or offers for the one or more customers;

retrieve one or more templates for the one or more offers based on receipt of a rules instruction; and transmit the templates to the one or more customers using one of a plurality of channels.

18. The non-transitory computer-readable storage medium of claim 17, wherein the one of the plurality of channels is selected based on the one or more templates, and wherein the plurality of channels includes an email channel, a telephone channel, and a text messaging channel.

19. The non-transitory computer-readable storage medium of claim 18, storing instructions which when executed by the processor cause the processor to:

retrieve, by the second queue, the first offer from the first queue;

pull, by the messaging agent, the first offer from the second queue;

determine the first offer is successfully provided to the one or more customers by the messaging agent via one or more of the plurality of channels; and update the topic of the streaming component with information associated with the successful provision of the first offer.

20. The non-transitory computer-readable storage medium of claim 14, wherein the second queue comprises an array blocking queue.

* * * * *